United States Patent

Martnelli et al.

[11] Patent Number: 5,907,419
[45] Date of Patent: May 25, 1999

[54] INFRARED COMMUNICATIONS SCHEME

[75] Inventors: John K. Martnelli; Wendell W. Ritchey, both of Camarillo; Leslie J. Reading, Goleta, all of Calif.

[73] Assignee: Interlink Electronics, Inc., Camarillo, Calif.

[21] Appl. No.: 08/955,004

[22] Filed: Oct. 20, 1997

[51] Int. Cl.⁶ .................................................. H04B 10/00
[52] U.S. Cl. ........................... 359/172; 359/182; 359/142
[58] Field of Search ..................................... 359/142, 146, 359/352, 172, 181–182; 370/277; 348/734; 340/825.72

[56] References Cited

U.S. PATENT DOCUMENTS 3,927,316  12/1975  Citta ......................................... 359/182
4,221,932  9/1980   Anglikowski et al. .................. 359/182
4,375,106  2/1983   Voll .
5,331,450  7/1994   Heep et al. .
5,508,836  4/1996   Decaro et al. .
5,574,585  11/1996  Thaler et al. .
5,602,664  2/1997   Doyle .
5,621,384  4/1997   Crimmins et al. .

Primary Examiner—Kinfe-Michael Negash
Attorney, Agent, or Firm—Brooks & Kushman P.C.

[57] ABSTRACT

Infrared communications scheme for an infrared transmitting device having a light emitting diode (LED) ramps up the power of a carrier frequency signal applied to the LED in a given time interval to a given value. The carrier frequency signal is then frequency modulated with a data message for transmission by the LED. The power of a DC signal applied to the LED may then be ramped up in a given time interval to a given value before the carrier frequency signal is modulated with a data message. After transmission of the data message, the power of the carrier frequency signal applied to the LED is ramped down in a given time interval to a given value. The power of the DC signal applied to the LED is then ramped down in a given time interval to a given value.

3 Claims, 4 Drawing Sheets

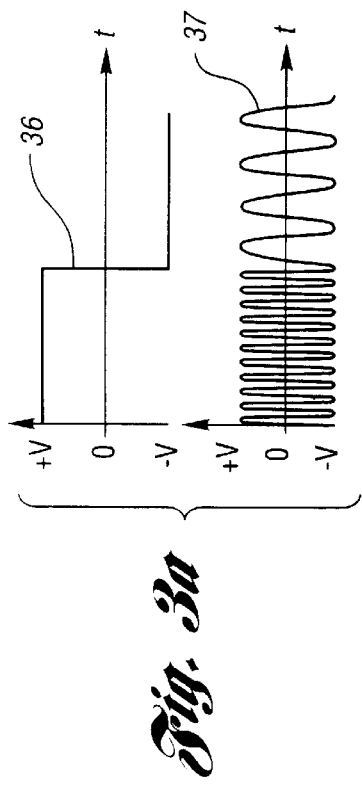
Fig. 3a
Fig. 3b
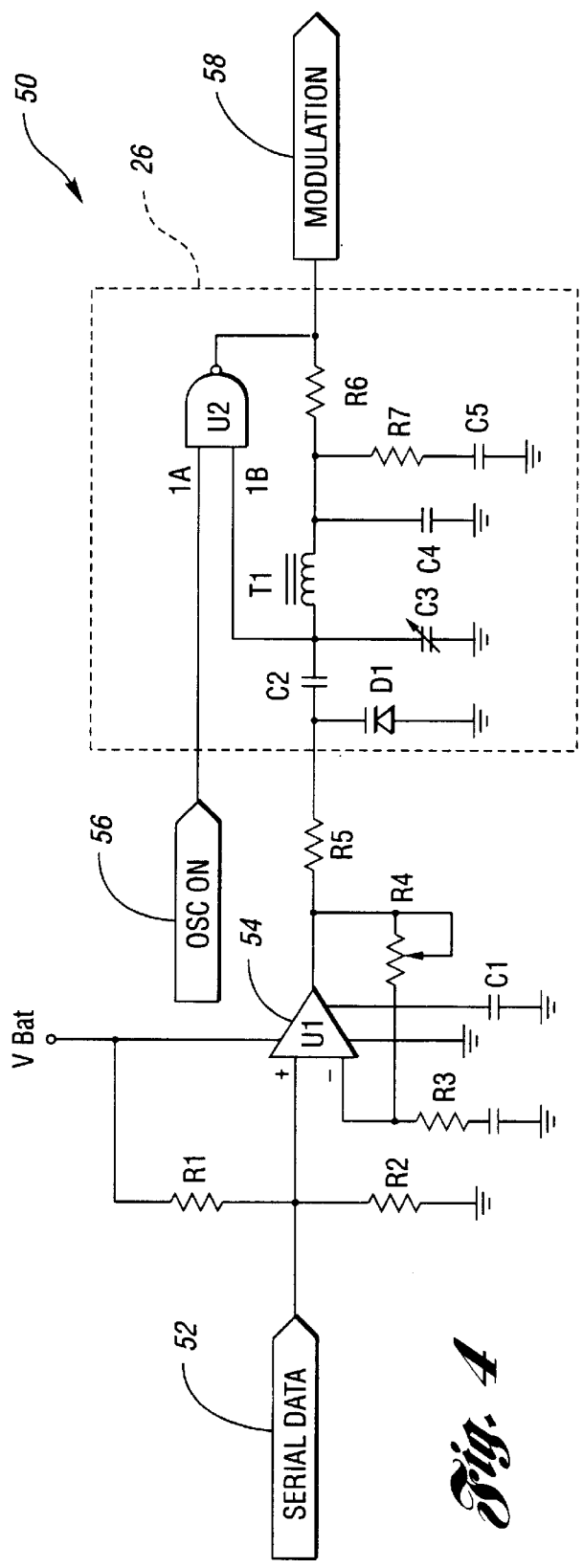
Fig. 4

INFRARED COMMUNICATIONS SCHEME

TECHNICAL FIELD

The present invention relates generally to infrared remote controls and input devices for computers and consumer electronics.

BACKGROUND ART

Current transmission schemes for infrared remote controls include transmitting a signal with a carrier frequency and on/off keying for data transmission. The on/off keyed data is usually transmitted in either BiPhase, Manchester, Pulse Position, or Pulse Width form.

Typically, infrared transmission schemes such as Infrared Remote Controls (IRC) have a carrier frequency falling within the range of 30–60 KHz. A disadvantage associated with IRC is that different remote control devices interfere with each other during simultaneous transmission. Thus, only one device can transmit at a time. This is particularly disadvantageous where it is desirable to control multiple remote devices simultaneously such as in a network configuration.

Another disadvantage associated with IRC is that the data rates are limited up to 4 Kbits per second. For many new generation input devices such as digitizers and touchpads where character recognition is desired, higher data rates are needed.

A further disadvantage associated with IRC results from the light emitting diode (LED) pulse switching transients. On/off keying leads to spectral impurity and associated broadband noises which limit the ability of multiple devices to transmit simultaneously.

A recently proposed technology called Consumer Infrared (CIR) also uses on/off keying. CIR is essentially a faster version of IRC but uses a 1.6 MHz carrier. The data rate for CIR is much higher than IRC. For instance, the data rate for CIR is 50 Kbits per second using Manchester encoding. However, CIR suffers from many of the same disadvantages suffered by IRC.

For instance, it is impossible to control multiple devices simultaneously with CIR. CIR possesses an unacceptable on/off keying spectral impurity similar to that of IRC. Furthermore, CIR has no provision for broadcasting live real time audio. Additionally, CIR supports a maximum of three communication channels. Market convergence requires more bandwidth than can be provided by these existing channels.

What is needed is an infrared communications scheme where multiple channels at separate carrier frequencies can communicate without disrupting each other.

SUMMARY OF THE INVENTION

Accordingly, it is an object of the present invention to provide an infrared communications scheme in which multiple infrared remote control devices can transmit simultaneously without interference from the other devices.

It is another object of the present invention to provide an infrared communications scheme in which multiple infrared remote control devices can transmit simultaneously without interference from other IRC and CIR devices.

It is a further object of the present invention to provide an infrared communications scheme in which data can be transmitted at a data rate of around 50 Kbits per second in addition to transmitting analog audio of FM radio quality.

It is still another object of the present invention to provide an infrared communications scheme in which simultaneous full duplex communication may be accomplished using two channels.

It is still a further object of the present invention to provide an infrared communications scheme suitable for a network configuration (multiple transmitters and receivers).

In carrying out the above objects and other objects, the present invention provides a communications method for an infrared transmitting device having a light emitting diode (LED). The method includes ramping up the power of a carrier frequency signal applied to the LED in a given time interval to a given value. The carrier frequency signal is then frequency modulated with a data message for transmission by the LED. The method may further include ramping up the power of a DC signal applied to the LED in a given time interval to a given value before the carrier frequency signal is modulated with a data message.

After transmission of the data message, the power of the carrier frequency signal applied to the LED is ramped down in a given time interval to a given value. The power of the DC signal applied to the LED is then ramped down in a given time interval to a given value.

Further, in carrying out the above objects and other objects, the present invention provides a device and system employing the procedure of the above-described method.

The advantages accruing to the present invention are numerous. The infrared communication scheme of the present invention uses no form of on/off keying. Instead, modulation of the carrier frequency of a transmitting device is done smoothly so that multiple devices can transmit simultaneously without interfering with one another. Furthermore, carrier modulation and DC biasing of the LED is ramped up smoothly to full power in a period of time which will not disturb other infrared transmitting devices. Data rates of 50 Kbits per second have been achieved with the communication scheme of the present invention.

These and other features, aspects, and embodiments of the present invention will become better understood with regard to the following description, appended claims, and accompanying drawings.

BRIEF DESCRIPTION OF THE DRAWINGS

FIG. 3A is a graph showing that the frequency variations of a voltage controlled oscillator are directly proportional to a modulating digital input voltage;

FIG. 3B is a graph showing that the frequency variations of a voltage controlled oscillator are directly proportional to a modulating analog input voltage;

FIG. 4 is a highly detailed schematic of the first stage of the transmitter of the present invention;

BEST MODES FOR CARRYING OUT THE INVENTION

Figure 1:
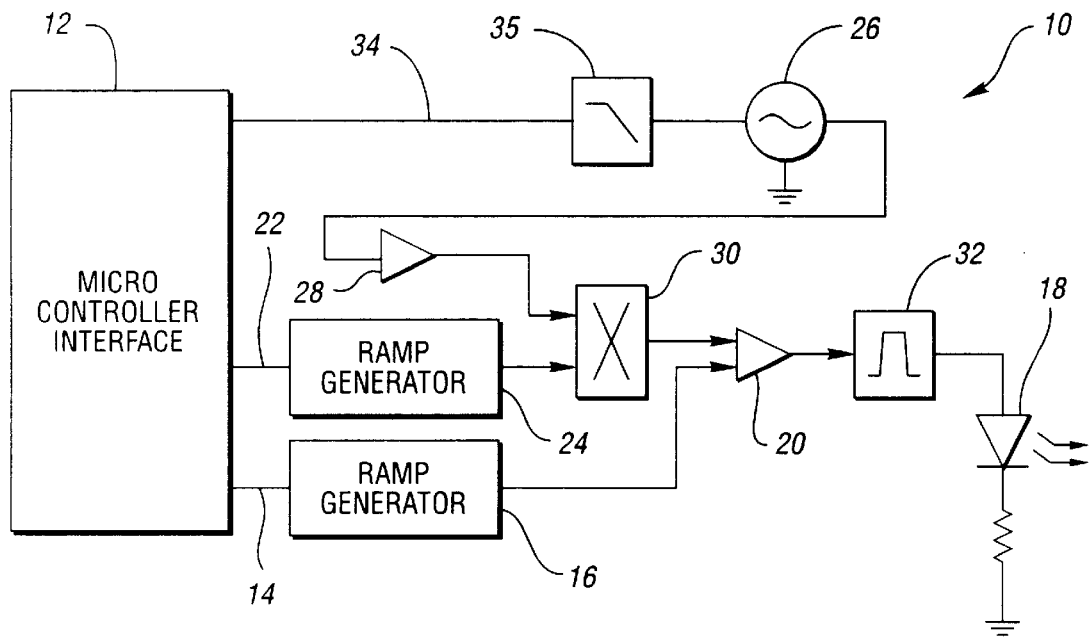
FIG. 1 is a schematic of a transmitter of a remote control device using the infrared communications scheme of the present invention.

Referring now to FIG. 1, a transmitter 10 of a remote control device for transmitting a signal using the infrared communications scheme of the present invention is shown. Transmitter 10 includes a micro controller interface 12. Interface 12 outputs two control signals and a data signal. First, at startup of transmitter 10, interface 12 outputs a transmit ramp control signal along transmission line 14 to ramp generator 16. Ramp generator 16 is connected to an infrared light emitting diode (LED) 18 by a summing amplifier 20. Preferably, LED 18 has a center wavelength of 940 nanometers. However, many other LEDs operable in the infrared and visible spectrum such as those with center wavelengths falling in the range of 400 to 2000 nanometers may be used.

The transmit ramp control signal controls ramp generator 16 to smoothly ramp up the DC power of LED 18 to a given value such as 50% of full operating power in a given startup time interval. Preferably, the startup time interval is on the order of microseconds, for instance, between 100 and 500 microseconds. Ramping the DC power of LED 18 from 0% to 50% in the startup time interval allows transmitter 10 to be powered without disrupting other remote control devices. At the end of the startup time interval, LED 18 outputs a DC biased light signal having a constant intensity.

Figure 2A:
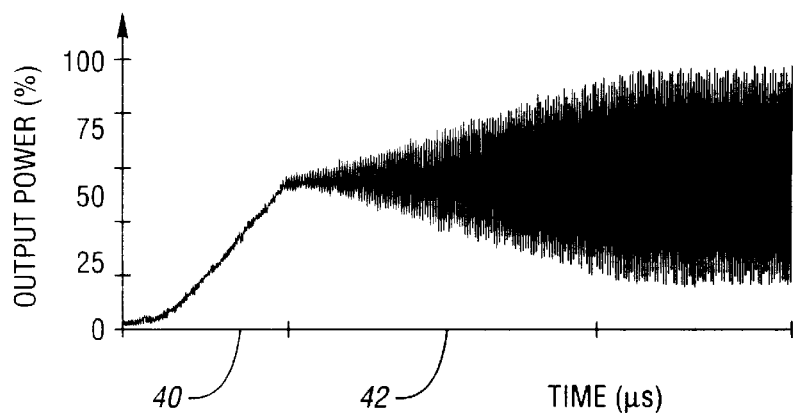
FIG. 2A is a graph of the output of the transmitter of the present invention at startup.

FIG. 2A is a graph illustrating the output power of transmitter 10 during the given startup time interval. Output power ramps from 0% to 50% in time segment 40. FIG. 2A implies linear ramping of the DC power of LED 18. Of course, the DC power may be ramped up non-linearly, sinusoidally, or the like. The only requirement is that the DC power is smoothly turned on without any step responses.

After the given startup time interval has expired and ramp generator 16 powered LED 18 to 50% of full operating DC power, interface 12 transmits a modulation ramp control signal along transmission line 22 to a ramp generator 24. The modulation ramp control signal controls ramp generator 24 to smoothly increase the power of a carrier frequency signal provided by a voltage controlled oscillator (VCO) 26. The power of the carrier signal may also be ramped linearly, nonlinearly, sinusoidally, or the like.

VCO 26 provides a carrier signal having smooth amplitude variations such as a sine wave, a rounded square wave, or a rounded triangular wave through a buffer 28 to a multiplier 30. Preferably, the carrier signal is a sine wave with a carrier frequency in the 1.0 MHz range, although carrier frequencies having much lower (such as 3 KHz) or higher (such as 100 MHz) may be used.

Ramp generator 24 is also connected to multiplier 30. Ramp generator 24 ramps up the power of the carrier signal smoothly via multiplier 30 to avoid interference with other devices. For instance, instead of abruptly generating a carrier signal of full power, ramp generator 24 ramps the power of the carrier signal from 0% to 100% in a given modulation time interval. This time interval begins after the startup time interval and is also on the order of microseconds, for instance, between 200 and 1000 microseconds.

Multiplier 30 outputs the ramped carrier signal to summing amplifier 20. Summing amplifier 20 sums the ramped carrier signal with the DC power signal from ramp generator 16 to form a DC biased sine wave signal output to bandpass filter 32. Bandpass filter 32 filters the DC biased sine wave signal and then provides it to LED 18. Thus, at the end of the modulation time interval, LED 18 outputs a DC biased sine wave light signal having a smoothly varying intensity.

FIG. 2A shows a graph of the output power of transmitter 10 during the modulation time interval. The output power of transmitter 10 ramps during this interval such that the output power varies from 25% to 100% at the end of the modulation time interval in time segment 42.

After LED 18 is powered at 50% and the carrier signal is fully powered at 100%, a data message is transmitted from interface 12 along transmission line 34. The data message is a digital signal which frequency modulates VCO 26. Preferably, the data message is filtered by a low pass filter 35 before modulating VCO 26 to help assist in keeping the transmission from LED 18 from interfering with other remote control devices. The data message is transmitted using data transmission schemes supported by frequency modulation (FM). These data schemes include Manchester, NRZ, serial, and the like. Of course, the data message may also be an analog signal. In this case, the analog signal may be representative of live real time audio.

As known to those of ordinary skill in the art, VCO 26 is an oscillator with a voltage variable reactance that controls the oscillator output frequency. VCO 26 is preferably linear with a proportionality constant k given in units of Hz/V which gives the amount by which an input voltage causes the output frequency to deviate from the average carrier frequency.

VCO 26 frequency variations about the carrier frequency follow exactly the input voltage variations. That is, a variable input voltage signal produces a variable output frequency signal as shown in FIG. 3A. In FIG. 3A, trace 36 represents a digital data message transmitted to VCO 26 from interface 12. Trace 37 represents the carrier signal output from VCO 26. The frequency of the carrier signal is higher when the digital signal is high as compared to when the digital signal is low.

In FIG. 3B, trace 38 represents an analog data message transmitted to VCO 26. Trace 39 represents the corresponding carrier signal output from VCO 26. The frequency of the carrier signal varies as a function of the voltage of the analog input signal.

Upon completion of transmission of a complete data message, the process for shutting down transmitter 10 commences. First, interface 12 transmits another modulation ramp control signal along transmission line 22 to ramp generator 24. The modulation ramp control signal controls ramp generator 24 to ramp down the power of the carrier signal from 100% to 0% in a given modulation shutdown time interval. The modulation shutdown time interval is on the order of microseconds, for instance, between 200 and 1000 microseconds.

After the modulation shutdown time interval, LED 18 outputs a DC biased light signal having a constant intensity. Interface 12 then transmits another transmit ramp control signal along transmission line 14 to ramp generator 16. The transmit ramp control signal controls ramp generator 16 to ramp down the power of the carrier signal from 50% to 0% in a given transmit shutdown time interval. The transmit shutdown time interval is on the order of microseconds, for instance, between 100 and 500 microseconds.

Figure 2B:
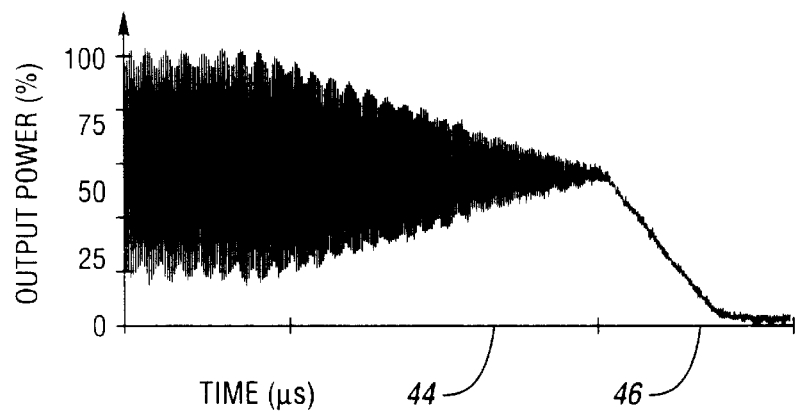
FIG. 2B is a graph of the output of the transmitter of the present invention at shutdown.

FIG. 2B shows a graph of the output power of transmitter 10 during the transmitter shutting down procedure. The output power of transmitter 10 initially ramps down from 100% to 0% such that the output power is at 50% at the end of the modulation shutdown time interval in time segment 44. The output power then ramps down at the end of the modulation shutdown time interval from 50% to 0% during the transmit shutdown time interval in time segment 46.

Ramping down the output power is done for the same reason that ramping up is done, namely, to avoid abrupt changes such as those associated with on/off keying. Thus, interference with other remote control devices is avoided. Accordingly, transmitter 10 may transmit simultaneously without interfering with other transmitters employing the communication scheme of the present invention or other transmitters using communication schemes associated with the prior art such as IRC and CIR. Ramping down either the DC power of LED 18 or the carrier signal of VCO 26 may be done linearly, nonlinearly, sinusoidally, or the like.

Referring now to FIG. 4, a highly detailed schematic of a first stage 50 of transmitter 10 is shown. In first stage 50, a serial data message is transmitted from a serial data input terminal 52. Input terminal 52 connects to an operational amplifier 54 which generates the voltage required to oscillate VCO 26. VCO 26 then produces a modulation signal 58.

Resistors R3 and R4 adjust the gain to match the full swing of input terminal 52 to shift the frequency of VCO 26 as required by the data bandwidth. The OSC ON control 56 is used to halt VCO 26 when the VCO is not in use. A capacitor C3 is used to adjust the center frequency of VCO 26. The center frequency is preferably set at 1.0 MHz, but may be adjustable with a between 400 KHz to 100 MHz.

Figure 5:
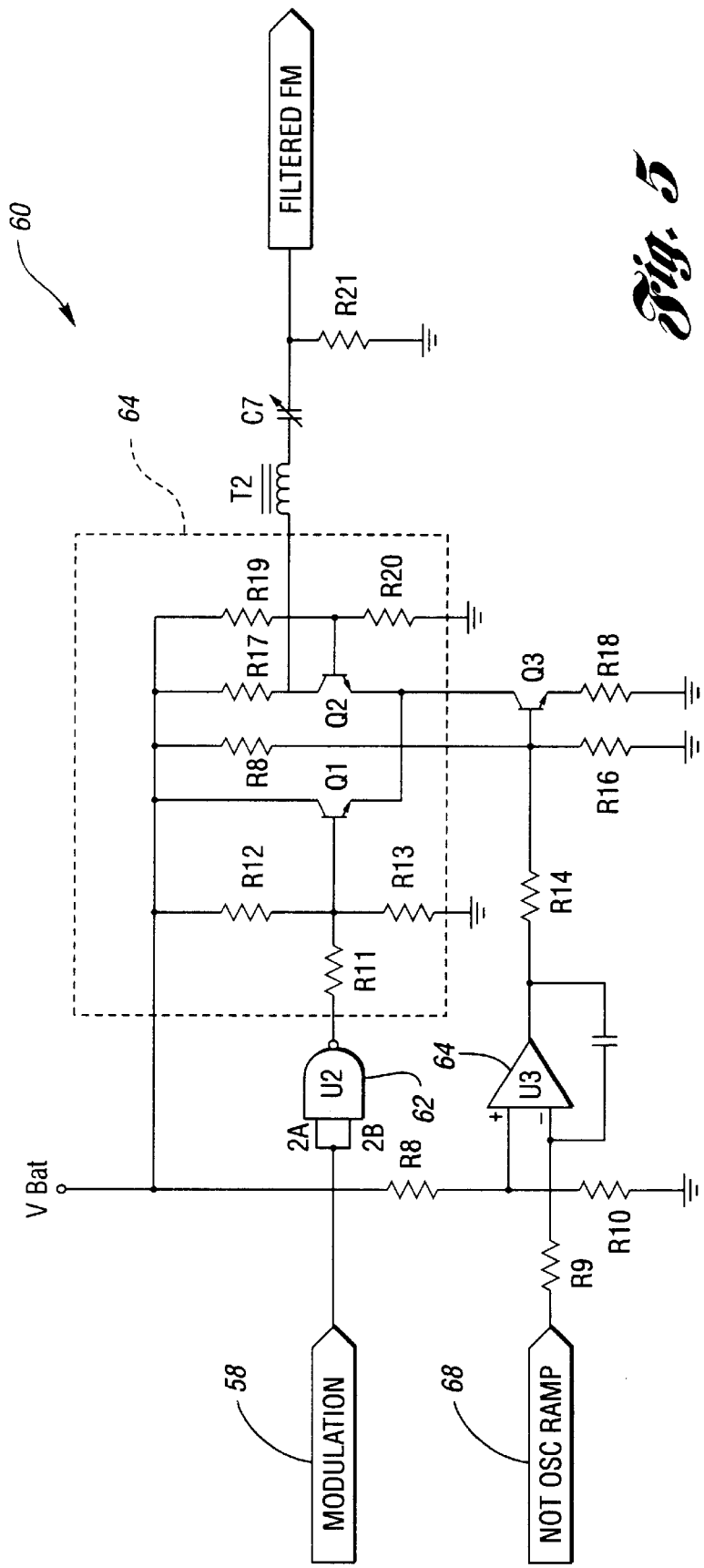
FIG. 5 is a highly detailed schematic of the second stage of the transmitter of the present invention.

Referring now to FIG. 5, a highly detailed schematic of a second stage 60 of transmitter 10 is shown. Initially, modulation signal 58 is buffered using a gate buffer 62 and then enters into a multiplier circuit 64 which is used to ramp the modulation. Preferably, multiplier circuit 64 includes a three transistor multiplier. Ramping the modulation is accomplished by a gate buffer 64 which is an operational amplifier wired as an integrator. When the NOT OSC RAMP control 68 is brought to logic ground, gate buffer 64 slews up the positive rail which activates the multiplier circuit, thus smoothly starting the output. An inductor T2, a capacitor C7, and a resistor R21 make up low pass filter 35 for smoothing the modulation to a sinusoidal waveform. Low pass filter 35 is tuned using the capacitor C7 to the center frequency of VCO 26.

Figure 6:
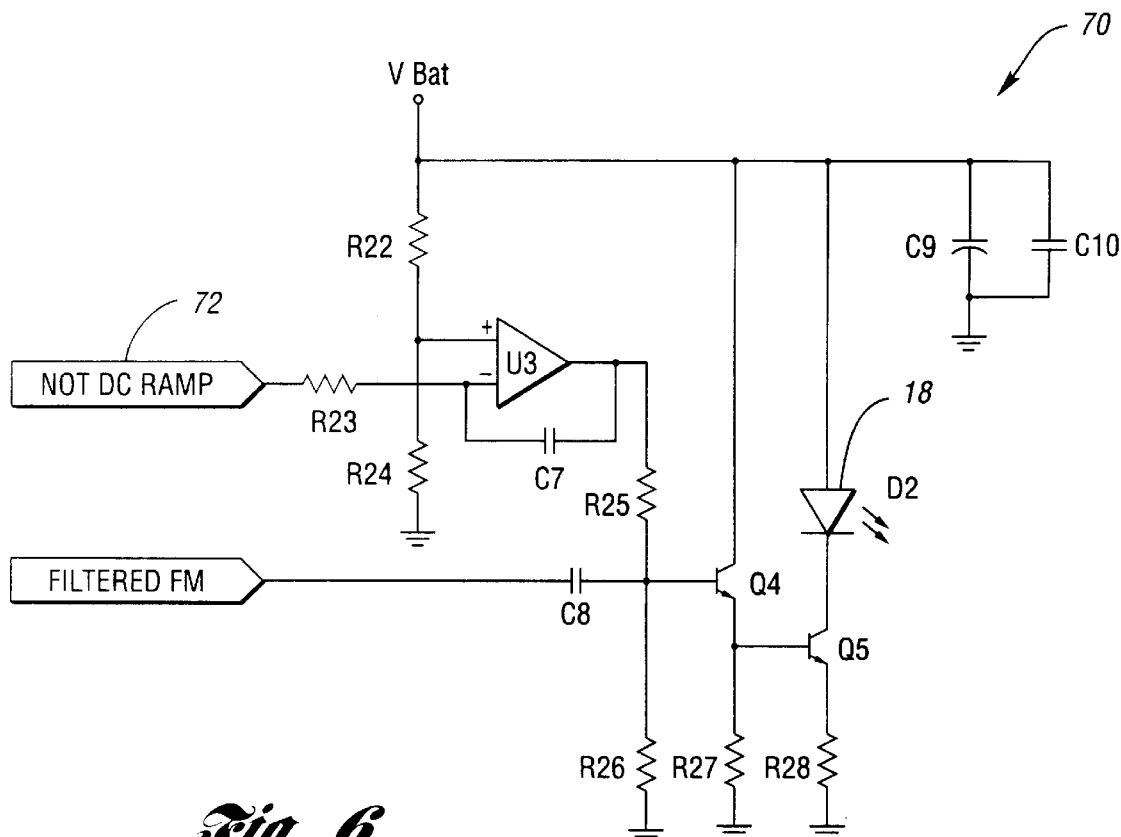
FIG. 6 is a highly detailed schematic of the third stage of the transmitter of the present invention.

Referring now to FIG. 6, a highly detailed schematic of a third stage 70 of transmitter 10 is shown. Third stage 70 combines the modulation with DC bias to modulate LED 18. A NOT DC RAMP 72 is accomplished similarly to the NOT OSC RAMP described above. The modulation is combined with the bias through a capacitor C8. Transistors Q4 and Q5 make up the power output amplifier to drive LED 18.

Figure 7:
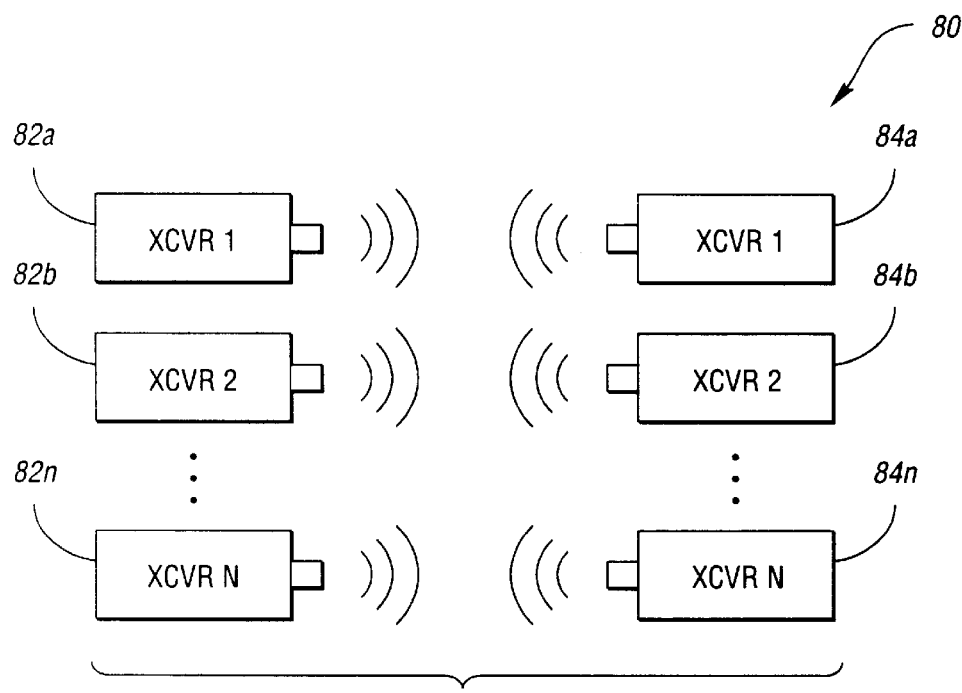
FIG. 7 is a block diagram of a network configuration (multiple transmitters and receivers) of the present invention.

Referring now to FIG. 7, a network 80 employing the concepts of the present invention is shown. Network 80 includes a first set of transceivers 82(a-n) and a second set of transceivers 84(a-n). Each transceiver includes a transmitter such as transmitter 10 for transmitting infrared signals. Each transceiver further includes an infrared receiver compatible for receiving the transmitted infrared signal.

The transmitters and receivers in each of the transceivers operate at different carrier frequencies to enable simultaneous full duplex communication. For instance, the transmitter of transceiver 82a may operate with a 1.0 MHz carrier frequency signal while its receiver operates with a 1.1 MHz carrier frequency signal. Correspondingly, the transmitter of transceiver 84a may operate with a 1.1 MHz to transmit signals to the receiver of transceiver 82a. Similarly, the receiver of transceiver 84a may operate with a 1.0 MHz carrier frequency signal to receive signals transmitted by transceiver 82a. The other transceivers in network 80 may operate with different carrier frequencies as desired. Furthermore, each of the transceivers may have multiple channels for transmission and reception at different frequencies.

Preferably, one of the transceivers in network 80 is the network controller. In this case, one of the channels of network 80 may be the control channel, a second channel may be used for new device activity requests, and the remaining channels may be managed by the network controller transceiver and assigned to active transmitters as required.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

For instance, the disclosed infrared communications scheme employs frequency modulation as a means to transmit both digital and analog signals. Digital data is broadcasted using Manchester encoding with minimal shift keying in an effort to eliminate abrupt frequency changes. It should be noted that other encoding methods (i.e., BiPhase, pulse position, etc.) are also acceptable under the modulation and switching constraints described above. Audio already conforms to the constraints for minimum-key shifting and is therefore transmitted as a FM signal.

What is claimed is:

1. An infrared communications system comprising:

a transmitter including a light emitting device (LED), an oscillator for applying a carrier frequency signal to the LED, a modulation ramp generator for ramping up the power of a carrier frequency signal applied to the LED in a given time interval to a given value, and a data terminal operable with the oscillator for frequency modulating the carrier frequency signal of the oscillator with a data message for transmission of an optical signal within a given channel having a given carrier frequency by the LED; and a receiver tuned to the carrier frequency of the optical signal for receiving the optical signal from the transmitter, wherein the transmitter is operable to transmit multiple optical signals within given channels having different carrier frequencies.

2. The system of claim 1 wherein the receiver is operable to receive the multiple optical signals.

3. The system of claim 1 wherein one of the given channels is a system control channel for controlling other transmitters and receivers.

* * * * *